United States Patent [19]

Seki

[11] Patent Number: 4,769,824
[45] Date of Patent: Sep. 6, 1988

[54] MIRROR HOLDING STRUCTURE OF GAS LASER SYSTEM

[75] Inventor: Fumio Seki, Tokyo, Japan

[73] Assignee: NEC Corporation, Japan

[21] Appl. No.: 28,763

[22] Filed: Mar. 23, 1987

[30] Foreign Application Priority Data

Mar. 28, 1986 [JP] Japan .............................. 61-47008[U]

[51] Int. Cl.$^4$ ................................................ H01S 3/03
[52] U.S. Cl. ...................................... 372/107; 372/61;
372/65; 372/103
[58] Field of Search ................. 372/107, 108, 65, 103, 372/99, 61

[56] References Cited

U.S. PATENT DOCUMENTS

| 4,201,951 | 5/1980 | Mohler | 372/107 |
| 4,375,688 | 3/1983 | Taguchi | 372/61 |
| 4,468,777 | 8/1984 | Takemori et al. | 372/107 |
| 4,613,972 | 9/1986 | Bettman | 372/107 |
| 4,644,554 | 2/1987 | Sheng | 372/107 |
| 4,646,336 | 2/1987 | Koseki | 372/65 |

FOREIGN PATENT DOCUMENTS

| 0057993 | 5/1979 | Japan | 372/33 |
| 2158991 | 11/1985 | United Kingdom | 372/65 |

Primary Examiner—James W. Davie
Assistant Examiner—Xuan T. Vo
Attorney, Agent, or Firm—Laff, Whitesel, Conte & Saret

[57] ABSTRACT

A gas laser system comprising a frame structure including a support member, a laser discharge tube fixed with respect to the frame structure, and a mirror holding structure comprising a mirror holder member positioned in conjunction with the support member, a reflector mirror received in the mirror holder member and aligned with the laser discharge tube, main retaining means pressing upon the mirror holder member toward the support member in a direction parallel with the center axis of the laser discharge tube, and elastic pressing means urging the mirror holder member away from the support member in a direction parallel with the center axis of the laser discharge tube, wherein the mirror holding structure further comprises auxiliary retaining means provided between the support member and the mirror holder member, the auxiliary retaining means comprising a multi-limb leaf spring having a center axis aligned with the center axis of the laser discharge tube and a plurality of limb portions extending radially from the center axis of the spring and each elastically deformable in a direction parallel with the center axis of the spring, the limb portions consisting of those securely attached adjacent their outer ends to the support member and those securely attached adjacent their outer ends to the mirror holder member.

6 Claims, 3 Drawing Sheets

MIRROR HOLDING STRUCTURE OF GAS LASER SYSTEM

FIELD OF THE INVENTION

The present invention relates to a gas laser system and, more particularly, to the mirror holding structure of a gas laser system.

BACKGROUND OF THE INVENTION

A known gas laser system has a mirror holding structure including a mirror holder plate in which a reflector mirror is mounted in alignment with the laser discharge tube supported by the frame structure of the system. The mirror holder plate is held in place with respect to the laser discharge tube by the combination of retaining means pressing against the mirror holder plate toward the frame structure and elastic pressing means urging the mirror holder plate away from the frame structure. The elastic pressing means typically uses initially coned or Belleville springs provided between the mirror holding and frame structures and pressing the mirror holder plate against the forces exerted by the retaining means. The mirror holder plate is positioned with respect to the frame structure so that the reflector mirror in the mirror holder plate is aligned with the laser discharge tube by the forces exerted by the retaining means and the opposing forces exerted by the elastic pressing means.

The mirror holding structure of the gas laser system thus constructed has a drawback in that the retaining and pressing means, particularly the pressing means implemented by the Belleville springs, are effective solely in axial directions of the mirror holding structure. If the laser discharge tube is subjected to vibrations or mechanical impacts in directions perpendicular to the axis of tube, the mirror holding structure would be dislocated from its proper position with respect to the laser discharge tube and might cause significant reduction in the power output of the system.

The present invention contemplates elimination of such a drawback of a gas laser system of the described nature and it is, accordingly, an important object of the present invention to provide a gas laser system having an improved mirror holding structure which is effective to cope with vibrations and impacts which may occur in any directions with respect to the gas laser discharge tube of the gas laser system.

SUMMARY OF THE INVENTION

In accordance with one outstanding aspect of the present invention, there is provided a gas laser system comprising (a) a frame structure comprising a support member, (b) a laser discharge tube held in place with respect to the frame structure and a center axis, and (c) a mirror holding structure comprising (c-1) a mirror holder member positioned in conjunction with the support member, (c-2) a reflector mirror held in place with respect to the mirror holder member and in alignment with the laser discharge tube, (c-3) main retaining means pressing upon the mirror holder member toward the support member in a direction substantially parallel with the center axis of the laser discharge tube, and (c-4) elastic pressing means urging the mirror holder member away from the support member in a direction substantially parallel with the center axis of the laser discharge tube against the force with which the mirror holder member is pressed upon by the retaining means, wherein the mirror holding structure further comprises auxiliary retaining means provided between the support member and the mirror holder member, the auxiliary retaining means comprising a multi-limb leaf spring having a center axis substantially aligned with the center axis of the laser discharge tube and a plurality of limb portions extending radially outwardly from the center axis of the spring and each elastically deformable in a direction substantially parallel with the center axis of the spring, the limb portions consisting of those securely attached adjacent their outer ends to the support member and those securely attached adjacent their outer ends to the mirror holder member.

In accordance with another outstanding aspect of the present invention, there is provided a gas laser system comprising (a) a frame structure comprising a support member, (b) a laser discharge tube held in place with respect to the frame structure and a center axis, and (c) a mirror holding structure comprising (c-1) a mirror holder member positioned in conjunction with the support member, (c-2) a reflector mirror held in place with respect to the mirror holder member and in alignment with the laser discharge tube, (c-3) main retaining means comprising a plurality of threaded rigid members securely engaging the frame structure and pressing upon the mirror holder member toward the support member of the frame structure in a direction substantially parallel with the center axis of the laser discharge tube, (c-4) elastic pressing means comprising a plurality of sets of spring elements respectively associated with the threaded rigid members and provided between the the support member of the frame structure and the mirror holder member of the mirror holding structure, the spring elements being effective to urge the mirror holder member away from the support member in a direction substantially parallel with the center axis of the laser discharge tube against the forces with which the mirror holder member is pressed upon by the threaded rigid members, and auxiliary retaining means provided between the support member and the mirror holder member, the auxiliary retaining means comprising a multi-limb leaf spring having a center axis substantially aligned with the center axis of the laser discharge tube and a plurality of limb portions extending radially outwardly from the center axis of the spring and each elastically deformable in a direction substantially parallel with the center axis of the spring, the limb portions consisting of those securely attached adjacent their outer ends to the support member and those securely attached adjacent their outer ends to the mirror holder member.

BRIEF DESCRIPTION OF THE DRAWINGS

The drawbacks of a prior-art gas laser system and the features and advantages of a gas laser system according to the present invention will be more clearly understood from the following description taken in conjunction with the accompanying drawings in which like reference numerals designate similar or corresponding members and elements and in which.

FURTHER DESCRIPTION OF THE PRIOR ART

Figure 1A:
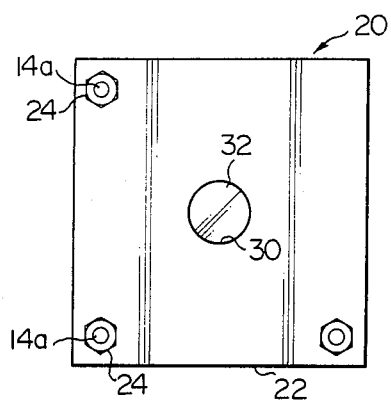
FIG. 1A is a schematic end view of an example of the mirror holding structure of a known gas laser system.
Figure 1B:
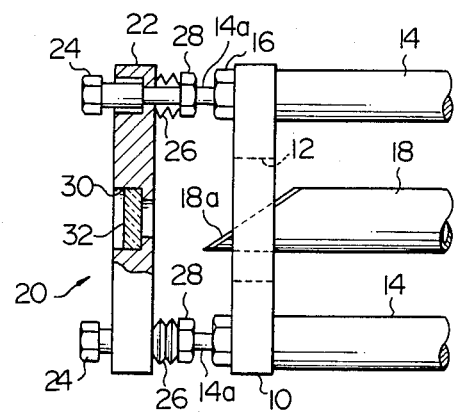
FIG. 1B is a schematic fragmentary side elevation view of the gas laser system including the mirror holding structure illustrated in FIG. 1A.

FIGS. 1A and 1B show an example of a prior-art gas laser system, particularly, the mirror holding structure of the system to which the present invention generally appertains.

As shown particularly in FIG. 1B, the gas laser system includes a frame structure including a front support plate 10 having a central opening 12 and at least three support rods 14 extending respectively through corner portions of the support plate 10. Each of the support rods 14 extends at right angles to the support plate 10 and has the support plate 10 securely fastened thereto by means of a nut 16 attached to a threaded portion (not shown) of each support rod 14. The support rods 14 have axial extensions 14a extending forwardly from the support plate 10. A gas laser discharge tube 18 extends in parallel with the support rods 14 and has a leading end portion provided by a Brewster-angle window 18a extending through the central opening 12 in the support plate 10 and terminating ahead of the mirror holder plate 22.

In front of the support plate 10 of the frame structure is provided a mirror holding structure 20 which comprises, in addition to the axial extensions 14a of the support rods 14, a mirror holder plate 22 which is positioned in parallel with the support plate 10. The mirror holder plate 22 is held in place on the extensions 14a of the support rods 14 by the combination of retaining means comprising nut members 24 and elastic pressing means comprising spring elements 26 and spring retainer nuts 28. Each of the nut members 24 has an internally threaded stem portion fitted to a threaded end portion of each of the support rods 14 though not seen in the drawings and, thus, presses upon the mirror holder plate 22 toward the support plate 10. The spring elements 26 forming part of the elastic pressing means comprise two pairs of initially coned or Belleville springs associated with each of the support rods 14 and stacked on one another between the rear face of the mirror holder plate 22 and each of the spring retainer nuts 28 as shown. The elastic pressing means thus composed of the four sets of Belleville springs 26 and the associated retainer nuts 28 are effective to urge the mirror holder plate 22 forwardly away from the support plate 10 against the forces with which the mirror holder plate 22 is pressed upon by the nut members 24 forming the retaining means.

The mirror holder plate 22 has formed therein a circular central aperture 30 in which a reflector mirror 32 is snugly fitted in an appropriate manner. The mirror holder plate 22 is positioned with respect to the frame structure so that the reflector mirror 32 thus received in the central aperture 30 of the mirror holder plate 22 is strictly aligned with the gas laser discharge tube 18. Such positioning of the mirror holder plate 22 is achieved by virtue of the combinations of the forces exerted by the retaining means composed of the nut members 24 and the opposing forced exerted by the elastic pressing means composed of the spring elements 26 and retainer nuts 28.

The mirror holding structure 20 of the known gas laser system thus constructed has a drawback in that the retaining means implemented by the nut members 24 and the pressing means implemented by the Belleville springs 26 and retainer nuts 28 are effective solely in axial directions of the mirror holding structure 20 as a whole. It may happen that the laser discharge tube 18 is subjected to vibrations or mechanical impacts in directions perpendicular or otherwise angled to the axis of tube 18 directly or through the frame structure. On such an occasion, the mirror holding structure 20 as a whole or particularly the reflector mirror 32 mounted on the mirror holding structure 20 would be dislocated from its proper position with respect to the laser discharge tube 18 and might cause reduction in the power output of the system due to misalignment between the reflector mirror 32 and the laser discharge tube 18.

The present invention aims at elimination of the drawback thus inherent in a gas laser system of the described type.

DESCRIPTION OF THE PREFERRED EMBODIMENT

Figure 2:
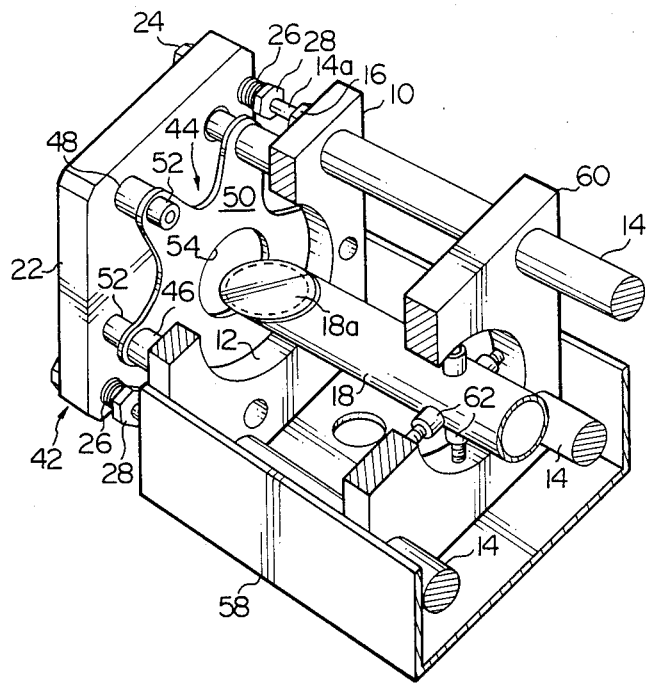
FIG. 2 is a schematic fragmentary perspective view showing a preferred embodiment of a gas laser system according to the present invention.
Figure 3A:
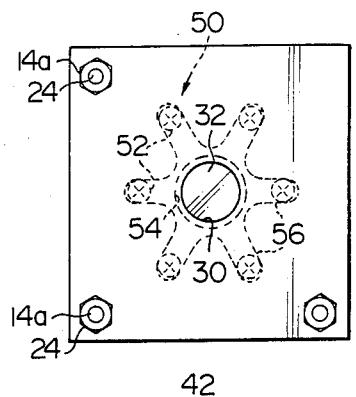
FIG. 3A is a schematic end view of the mirror holding structure of the gas laser system illustrated in FIG. 2.
Figure 3B:
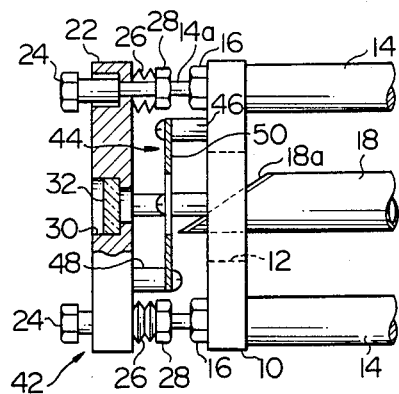
FIG. 3B is a schematic fragmentary side elevation view of the gas laser system shown in FIG. 2 and including the mirror holding structure illustrated in FIG. 3A.

In FIG. 2 and FIGS. 3A and 3B, a gas laser system embodying the present invention is, by way of example, shown to be basically similar in construction and arrangement to the prior-art gas laser system shown in FIGS. 1A and 1B. Thus, the gas laser system embodying the present invention comprises a frame structure including a front support plate 10 having a central opening 12 and at least three support rods 14 extending respectively through corner portions of the support plate 10. The support rods 14 have axial extensions 14a extending forwardly from the support plate 10 and have the support plate 10 securely fastened thereto by means of nuts 16.

A gas laser discharge tube 18 extends in parallel with the support rods 14 and terminates in a Brewster-angle window 18a extending through the central opening 12 in the support plate 10 toward the mirror holder plate 22. The support rods 14 are composed of a metal having a small linear thermal expansion coefficient such as typically invar steel. The other component elements which ordinarily form part of the frame structure being well known in the art and are rather immaterial to the understanding of the gist of the present invention, such elements are not herein shown and described.

The gas laser system embodying the present invention further comprises a mirror holding structure positioned in front of the support plate 10 of the frame structure. As in the prior-art system described with reference to FIGS. 1A and 1B, the mirror holding structure, now denoted in its entirety by reference numeral 42, comprises, in addition to the axial extensions 14a of the support rods 14, a mirror holder plate 22 which is positioned in parallel with the support plate 10. The mirror holder plate 22 is held in place on the extensions 14a of the support rods 14 by the combination of retaining means comprising nut members 24 and elastic pressing means comprising spring elements 26 and spring retainer nuts 28. Each of the nut members 24 has an internally threaded stem portion fitted to a threaded end portion of each of the support rods 14 though not seen in the drawings and, thus, presses upon the mirror holder plate 22 toward the support plate 10. The spring elements 26 forming part of the elastic pressing means comprise two pairs of initially coned or Belleville springs associated with each of the support rods 14 and stacked in series on one another between the rear face of the mirror holder plate 22 and each of the spring retainer nuts 28 as shown. The elastic pressing means thus composed of the four sets of Belleville springs 26 and the associated retainer nut 28 as provided in association with each of the support rods 14 are effective to urge the mirror holder plate 22 forwardly away from the support plate 10 against the forces with which the mirror holder plate 22 is pressed upon by the nut members 24 forming the retaining means.

The mirror holder plate 22 has formed therein a circular central aperture 30 in which a reflector mirror 32 is snugly fitted in an appropriate manner. The mirror holder plate 22 is positioned with respect to the frame structure so that the reflector mirror 32 thus received in the central aperture 30 of the mirror holder plate 22 is strictly aligned with the gas laser discharge tube 18. Such positioning of the mirror holder plate 22 is achieved by virtue of the combinations of the forces exerted by the retaining means composed of the nut members 24 and the opposing forced exerted by the elastic pressing means composed of the spring elements 26 and retainer nuts 28.

Thus, the gas laser system embodying the present invention comprises all the component members and elements forming the frame and mirror holding structures of the system described with respect to FIGS. 1A and 1B.

In the shown embodiment of the present invention, the mirror holding structure 42 comprises, in addition to such retaining and pressing means, radial or auxiliary retaining means 44 provided between the support plate 10 of the frame structure and the mirror holder plate 22 of the mirror holding structure 42. The auxiliary retaining means comprises two sets of rigid stay members 46 and 48, a single multi-limb leaf spring 50, and a plurality of fastening elements 52. The multi-limb leaf spring 50 has a suitable number of limb portions extending radially outwardly from the center axis of the spring 50 and each elastically deformable in a direction parallel with the center axis of the spring 50. In the embodiment herein shown, such a leaf spring 50 is provided in the form of a generally hexapodous spider spring having a central portion formed with a circular aperture 54 and six radial limb portions 56 provided around the central portion. One set of stay members 46 are secured to and project forwardly from the support plate 10 of the frame structure and the other set of stay members 48 are secured to and project rearwardly from the mirror holder plate 22. The radial limb portions 56 of the spider spring 50 project radially outwardly from the central portion of the spring 50 and are equiangularly spaced apart from each other about the center axis of the spring 50, as will be best seen from FIG. 3A. Of the six limb portions 56 of such a spider spring 50, three alternate ones are securely attached adjacent their outer ends to the support plate 10 each by each of stay members 46 and the other limb portions are securely attached adjacent their outer ends to the mirror holder plate 22 of the mirror holding structure 42 each by each of the stay members 48 as will be best seen from FIG. 2. The fastening elements 52 are used to have the individual limb portions 56 of the spring 52 secured to the stay members 46 and 48, respectively. The stay members 46 and 48 is constructed of, for example, aluminum.

In FIG. 2, the frame structure of the gas laser system is shown installed on a base structure 58 and the laser discharge tube 18 shown supported on an additional support plate 60 by means of fixture elements 62.

Each of the limb portions 56 of the hexapodous spider spring 50 is elastically deformable with respect to each of the support plate 10 of the frame structure and the mirror holder plate 22 of the mirror holding structure 42 in a direction parallel with the center axis of the spring 50. The mirror holder plate 22 of the mirror holding structure 42 or, more specifically, the reflector mirror 32 received in the mirror holder plate 22 is therefore movable axially with respect to the frame structure and accordingly to the laser discharge tube 18 supported by the frame structure. The alignment of the reflector mirror 32 with respect to the laser discharge tube 18 is thus maintained without being affected by the additional provision of the auxiliary retaining means between the mirror holding and frame structures of the system.

In addition, the limb portions 56 of the spider spring 50 are securely attached to each of the support plate 10 and mirror holder plate 22 by means of the stay members 46 and 48 and fastening elements 52. The stay members 46 and 48 being generally hexagrammically located about the center axis of the spring 50, the spring 50 is resistive to vibrations and impacts which may be imparted to the frame and mirror holding structures in any directions perpendicular to the center axis of the spring 50. The relative position of the mirror holder plate 22 of the mirror holding structure 42 with respect to the support plate 10 of the frame structure is thus maintained unchanged without being affected by the vibrations and impacts which may be exerted on the frame and mirror holding structures in directions perpendicular to the center axis of the spring 50.

What is claimed is:

1. A gas laser system comprising
   (a) a frame structure comprising a support member,
   (b) a laser discharge tube held in place with respect to the frame structure and a center axis, and
   (c) a mirror holding structure comprising
   (c-1) a mirror holder member positioned in conjunction with said support member,
   (c-2) a reflector mirror held in place with respect to the mirror holder member and in alignment with said laser discharge tube,
   (c-3) main retaining means pressing upon said mirror holder member toward said support member in a direction substantially parallel with the center axis of said laser discharge tube, and
   (c-4) elastic pressing means urging said mirror holder member away from said support member in a direction substantially parallel with the center axis of said laser discharge tube against the force with which the mirror holder member is pressed upon by said retaining means,
   wherein the mirror holding structure further comprises auxiliary retaining means provided between said support member and said mirror holder member, said auxiliary retaining means comprising a multi-limb leaf spring having a center axis substantially aligned with the center axis of said laser discharge tube and a plurality of limb portions extending radially outwardly from the center axis of the spring and each elastically deformable in a direction substantially parallel with the center axis of the spring, said limb portions consisting of those securely attached adjacent their outer ends to said support member and those securely attached adjacent their outer ends to said mirror holder member.

2. A gas laser system comprising
(a) a frame structure comprising a support member,
(b) a laser discharge tube held in place with respect to the frame structure and a center axis, and
(c) a mirror holding structure comprising
(c-1) a mirror holder member positioned in conjunction with said support member,
(c-2) a reflector mirror held in place with respect to the mirror holder member and in alignment with said laser discharge tube,
(c-3) main retaining means comprising a plurality of threaded rigid members securely engaging said frame structure and pressing upon said mirror holder member toward said support member of the frame structure in a direction substantially parallel with the center axis of said laser discharge tube,
(c-4) elastic pressing means comprising a plurality of sets of spring elements respectively associated with said threaded rigid members and provided between said said support member of said frame structure and said mirror holder member of the mirror holding structure, said spring elements being effective to urge said mirror holder member away from said support member in a direction substantially parallel with the center axis of said laser discharge tube against the forces with which said mirror holder member is pressed upon by said threaded rigid members, and
auxiliary retaining means provided between said support member and said mirror holder member, said auxiliary retaining means comprising a multi-limb leaf spring having a center axis substantially aligned with the center axis of said laser discharge tube and a plurality of limb portions extending radially outwardly from the center axis of the spring and each elastically deformable in a direction substantially parallel with the center axis of the spring, said limb portions consisting of those securely attached adjacent their outer ends to said support member and those securely attached adjacent their outer ends to said mirror holder member.

3. A gas laser system as set forth in claim 1 or 2, in which said leaf spring has a central portion formed with an aperture substantially aligned with the center axis of said laser discharge tube, said radial limb portions of the leaf spring projecting radially outwardly from the central portion of the spring and being substantially equiangularly spaced apart from each other about the center axis of the spring.

4. A gas laser system as set forth in claim 3, in which the limb portions of said leaf spring consists of a plurality of alternate ones securely attached adjacent their outer ends to said support member of said frame structure and a plurality of alternate ones securely attached adjacent their outer ends to the mirror holder member of the mirror holding structure.

5. A gas laser system as set forth in claim 4, in which said auxiliary retaining means further comprises two sets of rigid stay members, one set of stay members being secured to and projecting from said support member of said frame structure and the other set of stay members being secured to and projecting from said mirror holder member of said mirror holding structure, the limb portions of said leaf spring consisting of a plurality of alternate ones securely attached adjacent their outer ends to said support member of said frame structure each by each of said one set of stay members and a plurality of alternate ones securely attached adjacent their outer ends to the mirror holder member 22 of the mirror holding structure each by each of said other set of stay members.

6. A gas laser system as set forth in claim 5, in which each of said stay members is constructed of aluminum.

* * * * *